J. W. POSEY.
ATTACHMENT FOR AUTOMOBILES.
APPLICATION FILED JAN. 5, 1916.

1,199,604.

Patented Sept. 26, 1916.

Witnesses

Inventor
J. W. Posey.

Attorneys

UNITED STATES PATENT OFFICE.

JACKSON W. POSEY, OF COURTENAY, NORTH DAKOTA.

ATTACHMENT FOR AUTOMOBILES.

1,199,604.  Specification of Letters Patent.  Patented Sept. 26, 1916.

Application filed January 5, 1916. Serial No. 70,455.

*To all whom it may concern:*

Be it known that I, JACKSON W. POSEY, a citizen of the United States, residing at Courtenay, in the county of Stutsman, State of North Dakota, have invented certain new and useful Improvements in Attachments for Automobiles; and I do hereby declare the following to be a full, clear, and exact description of the invention, such as will enable others skilled in the art to which it appertains to make and use the same.

This invention relates to improvements in attachments for automobiles, and particularly to a device for attachment to the wind-shield.

The principal object of the invention is to provide a curtain for attachment to the wind shield of an automobile which can be pulled down to shield the eyes of the driver from the glare of the light from the headlights of an approaching automobile.

Another object is to provide a curtain of this character which will protect the eyes of the driver, while at the same time permit him to see the road ahead of the vehicle.

Other objects and advantages will be apparent from the following description when taken in connection with the accompanying drawing.

Figure 1:
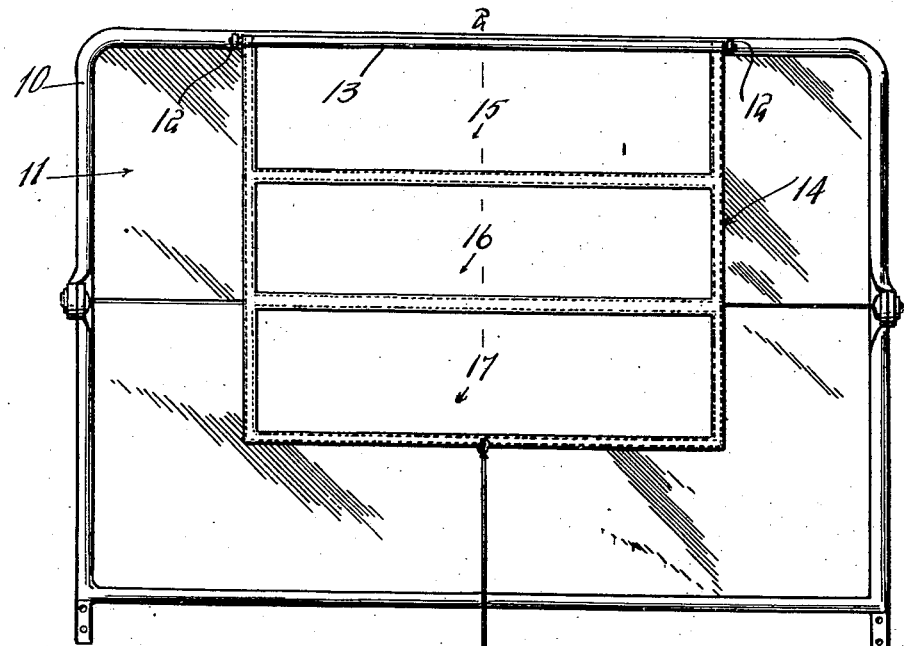
Figure 2:
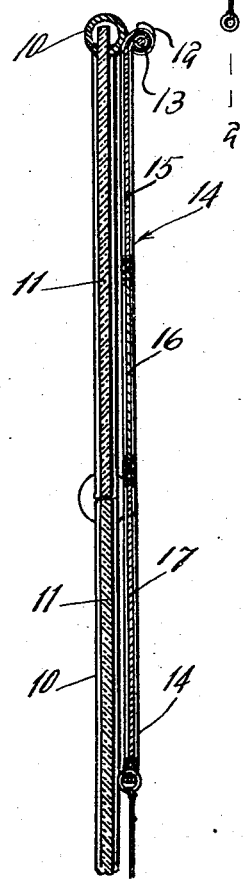

In the drawing: Figure 1 is a rear elevation of the wind-shield equipped with my improved curtain, the curtain being in lowered position; and Fig. 2 is an enlarged vertical section on the line 2—2 of Fig. 1.

Referring particularly to the accompanying drawing, 10 represents the frame of the wind-shield and 11 the glass thereof. Carried by the upper part of the frame is a pair of brackets 12 which support a spring shade roller 13. Secured at one end to this roller, and adapted to be wound thereon is a celluloid curtain 14, the same being made up of the sections 15, 16 and 17 and suitably connected together. These sections are colored, and may be of the same color, but of different shades or of different colors, as desired. One section is to be light in color, the next section medium, while the remaining section is to be of a darker hue. Thus the driver can pull the curtain down until the proper section shields his eyes from the glare of the approaching headlight, and according to the strength of the light from the approaching vehicle or the condition of the driver's eyes, the section best suited to protect his eyes can be quickly and easily positioned.

What is claimed is:

An attachment for the wind-shield of an automobile comprising brackets adapted to be secured to the shield, a spring roller mounted in the brackets and a curtain secured to and adapted to be rolled on the roller comprising a plurality of colored sections of different degrees of transparency.

In testimony whereof, I affix my signature, in the presence of two witnesses.

JACKSON W. POSEY.

Witnesses:
 H. S. POSEY,
 EDITH I. POSEY.